United States Patent
Sudau et al.

[11] Patent Number: 6,058,802
[45] Date of Patent: May 9, 2000

[54] TORSIONAL VIBRATION DAMPER WITH AXIALLY TOOTHED GEAR ELEMENTS

[75] Inventors: Jörg Sudau, Niederwerrn; Bernhard Schierling, Künach, both of Germany

[73] Assignee: Mannesmann Sachs AG, Schweinfurt, Germany

[21] Appl. No.: 09/056,192

[22] Filed: Apr. 6, 1998

[30] Foreign Application Priority Data

Apr. 7, 1997 [DE] Germany .............. 197 14 224

[51] Int. Cl.$^7$ .............. G05G 1/00; F16F 15/10
[52] U.S. Cl. .............. 74/573 F; 74/572; 74/574; 475/347; 464/68
[58] Field of Search .............. 74/572–574; 475/347; 464/68; 192/70.17

[56] References Cited

U.S. PATENT DOCUMENTS

| | | | |
|---|---|---|---|
| 2,857,777 | 10/1958 | Porter | 74/432 |
| 4,346,624 | 8/1982 | Nagasaki et al. | 74/572 X |
| 5,536,208 | 7/1996 | Krumm | 464/68 |
| 5,551,928 | 9/1996 | Sudau | 475/347 |
| 5,570,615 | 11/1996 | Westphal et al. | 74/574 |
| 5,634,866 | 6/1997 | Sudau | 475/347 |
| 5,766,109 | 6/1998 | Sudau | 475/347 |
| 5,836,216 | 11/1998 | Sudau et al. | 74/574 |
| 5,878,856 | 3/1999 | Sudau et al. | 192/70.17 |

FOREIGN PATENT DOCUMENTS

| | | | |
|---|---|---|---|
| 36 30 298 A1 | 5/1987 | Germany | F16D 3/14 |
| 36 30 398 A1 | 5/1987 | Germany | F16D 3/14 |
| 94 14 314 | 1/1995 | Germany | F16D 13/60 |
| 2 285 109 | 6/1995 | United Kingdom | F16F 15/134 |
| 2 290 597 | 1/1996 | United Kingdom | F16F 15/131 |
| 2296072 | 6/1996 | United Kingdom | 74/573 F |
| 2297820 | 8/1996 | United Kingdom | 74/573 F |
| 2 310 912 | 9/1997 | United Kingdom | F16F 15/134 |

*Primary Examiner*—Vinh T. Luong
*Attorney, Agent, or Firm*—Cohen, Pontani, Lieberman & Pavane

[57] ABSTRACT

A torsional vibration damper has a drive-side transmission element and an output-side transmission element rotatable relative thereto that is connected to the drive-side transmission element via a damping device. The damping device includes a first gear element and a second gear element that are in a meshed engagement with each other via a first set of teeth and a second set of teeth, respectively. The sets of teeth for each gear element is provided on the axial sides of the gear elements. A positioning device axially positions the gear elements relative to each other for adjusting the penetration depth of the meshed engagement of the first and second sets of teeth.

13 Claims, 6 Drawing Sheets

TORSIONAL VIBRATION DAMPER WITH AXIALLY TOOTHED GEAR ELEMENTS

BACKGROUND OF THE INVENTION

1. Field of the Invention

The invention relates to a torsional vibration damper for a motor vehicle transmission having a drive-side transmission element which is rotatable about an axis of rotation, an output-side transmission element which is rotatable relative to the drive-side transmission element and a damping device connected between the drive-side and output-side transmission elements, wherein tile damping device comprises two gear elements which are connectable via toothings on each of the gear elements.

2. Description of the Related Art

A torsional vibration damper is known from German Utility Patent DE 94 14 314 that has a drive-side transmission element and an output-side transmission element rotatable relative thereto. The two transmission elements have at least one centrifugal mass each and are connected to each other via a damping device. The damping device has gear elements of a planetary gear set, for example, an annulus or planetary wheels, engaged therewith. Each of these gear elements is embodied with a set of teeth extending in the radial direction, with which a meshing connection with the other respective gear element is established.

When a torsional vibration damper is equipped with gear elements of this type, the gear elements accelerate during the transmission of torsional vibrations, and execute a movement relative to the transmission element that holds them. As a result, the mass inertia moment, which counteracts equidirectional fluctuations of the drive, is higher than it should be based on the mass of the torsional vibration damper. Thus, torque fluctuations at the engine front can be damped especially effectively by the increased mass inertia moment up to an engine speed of approximately 2500 RPM. However, the placement of the set of teeth at the radially outer region, with the gaps between each two teeth in the circumferential area located at the greatest distance from the rotational axis, reduces the amount of producible mass inertia moment for each planetary gear. This may be compensated for by positioning mass rings or mass disks axially adjacent to the toothing, for example. However, this measure enlarges the axial extension of the torsional vibration damper, something that is absolutely to be avoided, especially in smaller vehicles.

Above 2500 RPM, the torsional vibrations produced by the drive, e.g., an internal combustion engine, become ever more higher in frequency, but also ever smaller in amplitude. In this situation, the higher mass inertia moment produced by the gear elements acts disadvantageously compared to a torsion vibration damper without such gear elements. The prior art reference discloses no measures to solve this problem.

At speeds below 2500 RPM, torsional vibration dampers without gear elements between the drive-side and output-side transmission elements, as known, for example, from German reference DE 36 30 398 A1, display poorer behavior than the torsional vibration dampers with the gear elements as described above due to their relatively smaller mass inertia moment. On the other hand, at speeds above 2500 RPM, such torsional vibration dampers are better suited to filter out the high-frequency vibrations that have small amplitudes.

SUMMARY OF THE INVENTION

The object of the invention is to embody a torsional vibration damper such that the mass inertia moment can be optimally adjusted to the particular operating conditions of a drive.

According to the invention, this object is attained by a damping device connected between a drive-side transmission element and an output-side transmission element comprising gear elements, wherein each gear element includes a set of teeth on an axial side facing the other of the gear elements.

By including gear elements in the torsional vibration damping device, each of which has an axially projecting set of teeth on the axial side facing the other respective gear element, the invention ensures that the outermost circumferential area of these gear elements is kept tooth-free. As a result, the maximum mass inertia moment occurs on the gear elements in each case, relative to their diameter and axial breadth. The torsional vibration damper equipped with these gears is therefore excellently suited, especially at low speeds, to counteract torsional vibrations on the drive. Because the gear elements have axial toothings, these toothings can be located at a freely selectable distance from the rotational axis of the respective gear elements. This configuration allows influence to be exercised on the mass inertia moment of these gear elements via the radial position of the axial toothing.

An especially vital point of the invention is the presence of a positioning device for the gear elements. This positioning device predetermines the penetration depth of the meshing engagement of the sets of teeth with each other. Thus, the positioning device influences the axial distance of the gear elements relative to each other. In a special setting of the positioning device, the gear elements may be drawn so far apart that their sets of teeth become disengaged. At that point, the gear elements are disconnected from the transmission of moment, so that the torsional vibration damper works from then on with a lower mass inertia moment. In the preferred embodiment, the disengagement of the gear elements occurs above speeds of approximately 2500 RPM, or above speeds at which higher mass inertia of the planetary wheels becomes disadvantageous. As soon as the speed falls below the aforementioned value and a higher mass inertia moment seems advantageous, the gear elements can again be brought, by the meshing engagement of their respective sets of teeth, back into the inertial moment flow. This engagement process, thanks to the axial projecting teeth, may be carried out without large moment jumps and thus in an almost jolt-free manner. Damage to the teeth is thus ruled out.

The aforementioned positioning device may be a driven element that drives an adjacent gear element in the axial direction. However, it is also possible for the positioning device to simply have an adjusting element, which can consist, for example, of an axial spring, whereby the axial spring is adjusted under the effect of centrifugal force. Assuming a cup spring as the adjusting element, for example, the latter is deformed, as speed increases, in such a way as to become flatter in the axial direction, while its extension width in the radial direction is increased. At the same time, because of meshing engagement of the axially projecting teeth between the gear elements, an axial force is active, which, in interaction with the aforementioned spring deformation, causes the gear elements to distance themselves axially from each other, until their toothings are brought out of engagement. Similarly, however, a reduction in speed will return the adjustment element to its original deformation state, so that the axially movable gear element is moved back toward the other gear element, and the engagement of the sets of teeth is thus reestablished.

In the event that the aforementioned adjusting element is to be attached to a gear element, for example, and lies, during deflection movements of the gear element, with its opposite end on one of the transmission elements, the adjusting element can also act as a friction device. It is also conceivable for the adjusting element to be attached to the transmission element and brought to rest, relative to the gear element, in a frictional manner. The claims indicate different embodiments in regard to this.

A further possibility in embodying such an axial toothing on gear elements is to embody the toothing not with a constant distance relative to the rotational axis of the gear elements, as, for example, on planetary wheels, but rather along a predeterminable curved path, such as a spiral. As a result, when the toothing, on its path, comes ever closer to the rotational axis of the gear element, it is necessary to simultaneously enlarge the tooth distance, in order to retain the possibility of engagement for the particular associated tooth of the other gear element. Of course, this changes the translation with which the gear elements act, e.g., depending on the deflection angle and thus on the level of the particular torsional vibrations. The consequence is that each torsional vibration can be associated with the particular optimal translation ratio on the gear elements of the torsional vibration damper. To ensure continued engagement of the toothings, despite such a curved path, it is advantageous to provide a toothing on the other respective gear element that is substantially larger in the radial direction than that along the curved path.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Examples of the invention are explained in greater detail below in reference to the drawings. In the drawings.

DETAILED DESCRIPTION OF THE PRESENTLY PREFERRED EMBODIMENTS

Figure 1:
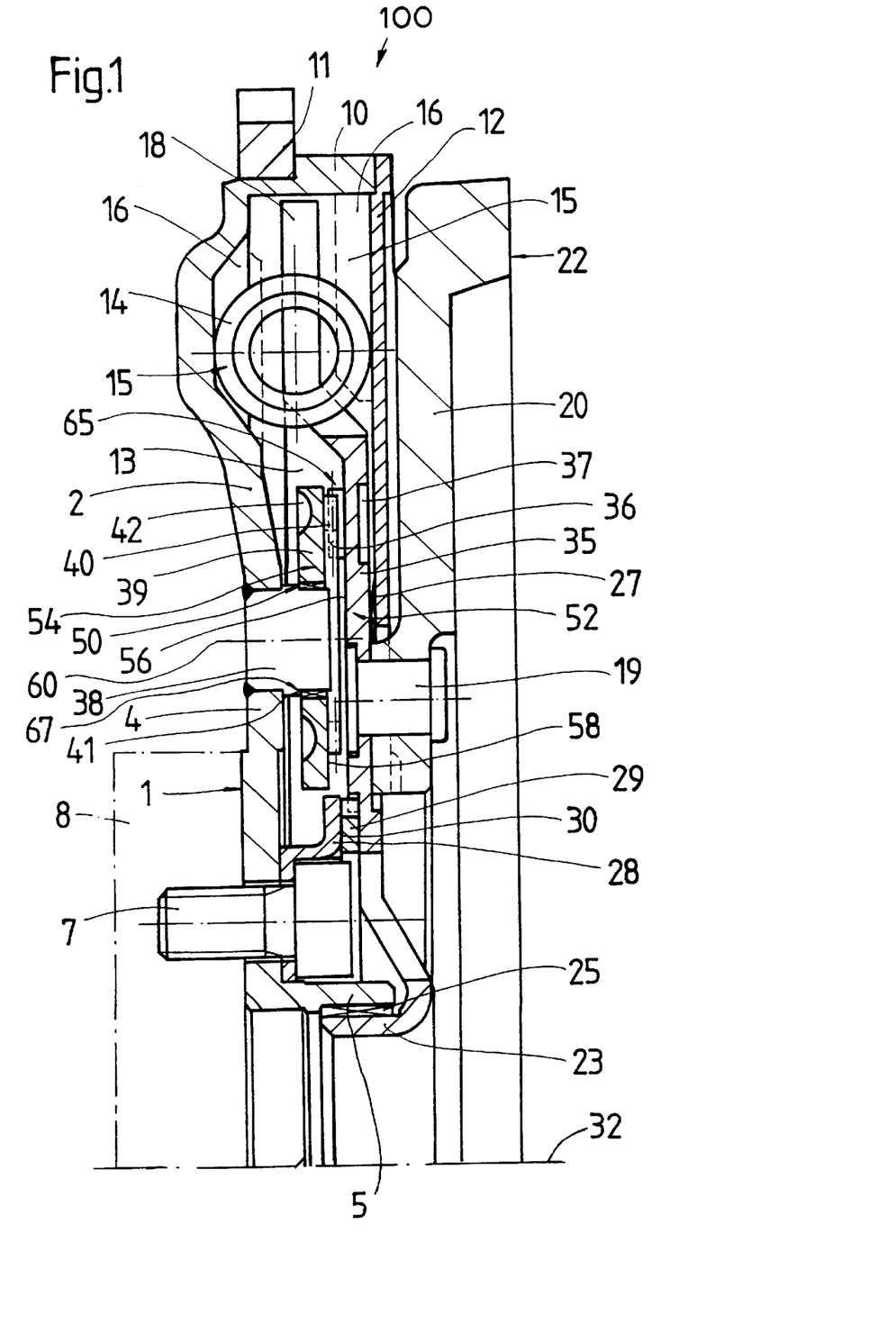
FIG. 1 is a sectional view of a radially half portion of a torsional vibration damper in accordance with the invention with gear elements that have an axial toothing, in an axially fixed arrangement to each other.

FIG. 1 shows a torsional vibration damper 100 with a drive-side transmission element 1 which acts as a centrifugal mass 2 and has a primary flange 4 that runs radially outward. The radially inner area of the drive-side transmission element also includes a primary hub 5. The primary flange 4 has openings for the passage of attachment means 7, which hold a clamping element 28 (to be discussed in greater detail later). The attachment means 7 serve to connect the primary flange 4 to a crank shaft 8 (dashed-dotted line) of a drive (not shown), such as an internal combustion engine. The radially outer area of the primary flange 4 comprises an axial section 10 which carries a gear ring 11 on its radially outer surface. The free axial end of axial section 10 holds a cover plate 12 which extends radially inward from axial section 10. The cover plate 12 and the primary flange enclose a grease chamber 13 in which are arranged elastic elements 14 of a damping device 15. As is known in the art, the grease chamber 13 holds a volume of a viscous medium which facilitates quiet and smooth operation of the torsional vibration damper 100. However, the viscous medium is not shown in FIG. 1 so that the interconnections between the various parts of the torsional vibration damper 100 may be more clearly depicted. Control elements 16 are provided on sides of the grease chamber 13 which are the primary flange 4 and the cover plate 12. The other end of the elastic elements 14 rest on a hub disk 18, whose radially inner area is attached with rivets 19 to a centrifugal mass 20. The hub disk 18 and the centrifugal mass 20 are essential components of an output-side transmission element 22. Interacting with the hub disk 18 in the radially inner area of the cover plate 12 is a first seal 27 which prevents the emergence of viscous medium from the grease chamber 13. The radially inner area of the hub disk 18 comprises a secondary hub 23 which extends toward the crank shaft 8 and holds, between itself and the primary hub 5, a radial bearing 25. Radially farther outside of the secondary hub 23, the hub disk 18 supports an axial bearing 29 which rests, at the other side, on the aforementioned clamping element 28 and, in connection therewith, serves as the second seal 30 of the grease chamber 13. The drive-side and the output-side transmission elements 1 and 22 are rotatable around a center axis 32 of the torsional vibration damper 100.

The hub disk 18 described above acts as a first gear element or an annulus 35 of a planetary gear set 65, for which reason the hub disk 18 comprises a first toothing 36 in the radially central area. This first toothing 36 projects axially and is produced by extrusions 37, which are undertaken from the output side of the hub disk 18. The first toothing 36 extends toward a second toothing 40 of a second gear element of the planetary gear set 65 or a planetary wheel 39 which is pressed via a bearing onto a bearing journal 38 provided on the primary flange 4. The planetary wheel 39 is rotatable around a rotational axis 60 and has extrusions 42 on its side facing the crank shaft to produce a second toothing 40, which also projects axially. The second toothing has a radial outer side 40a and a radial inner side 40b. Both the radial outer side 40a and the radial inner side 40b project axially from the planetary wheel 39. That is, the surfaces of the radial outer side 40a and the radial inner side 40b are free, i.e., not connected to the planetary wheel. The planetary wheel 39 rests axially on a radial projection 67 of the bearing journal 38. This radial projection 67 acts as a positioning device 50 for the planetary wheel 39 by establishing the axial distance of the latter relative to the annulus 35 and thereby determining an engagement depth 81 of the first toothing 36 in the second toothing 40. The annulus 35 acts as a gear element 52, while the planetary wheel 39 acts as another gear element 54, of the torsional vibration damper 100. The annulus 35 and the planetary wheel 39 form the planetary gear set 65. In the drawing, the axial side of the annulus 35 that faces the planetary wheel 39 has the reference number 56, while the axial side of the planetary wheel 39 that faces the annulus 35 is marked with number 58.

Figure 2:
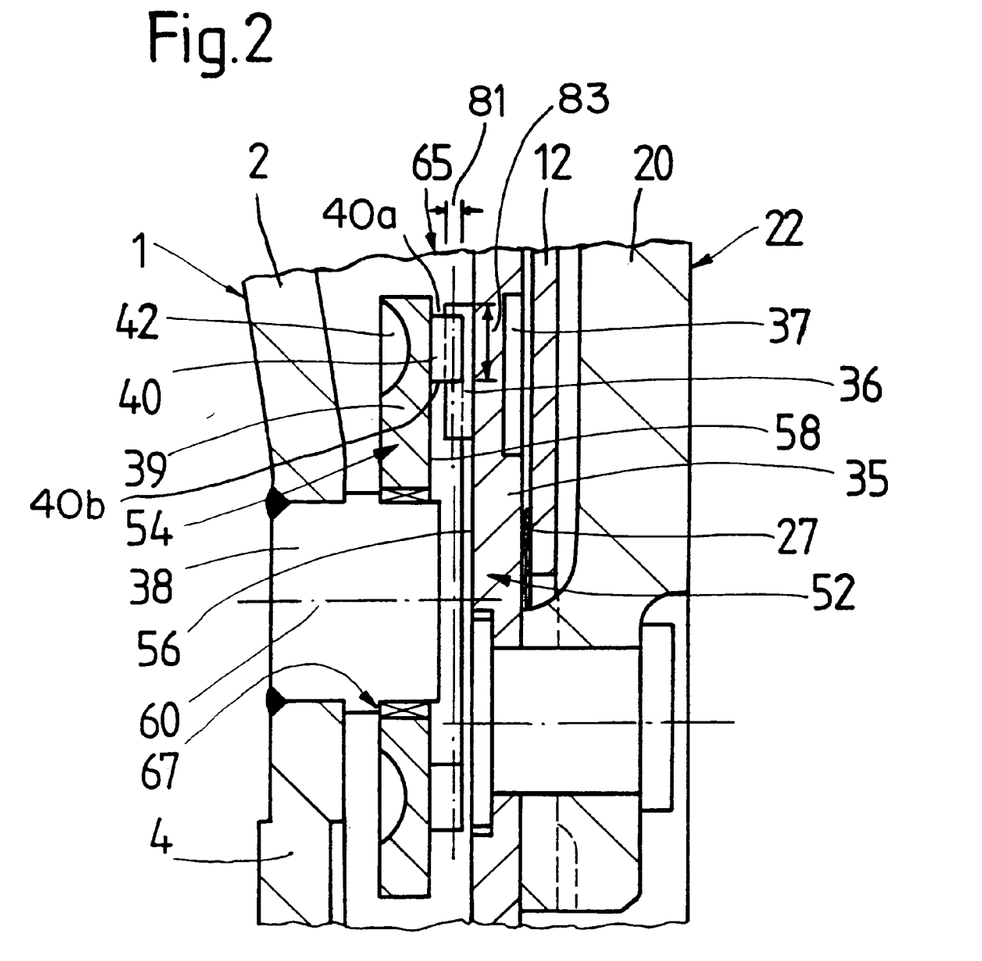
FIG. 2 is an enlarged detail of the area where the gear elements are engaged with each other by axial toothing.
Figure 7:
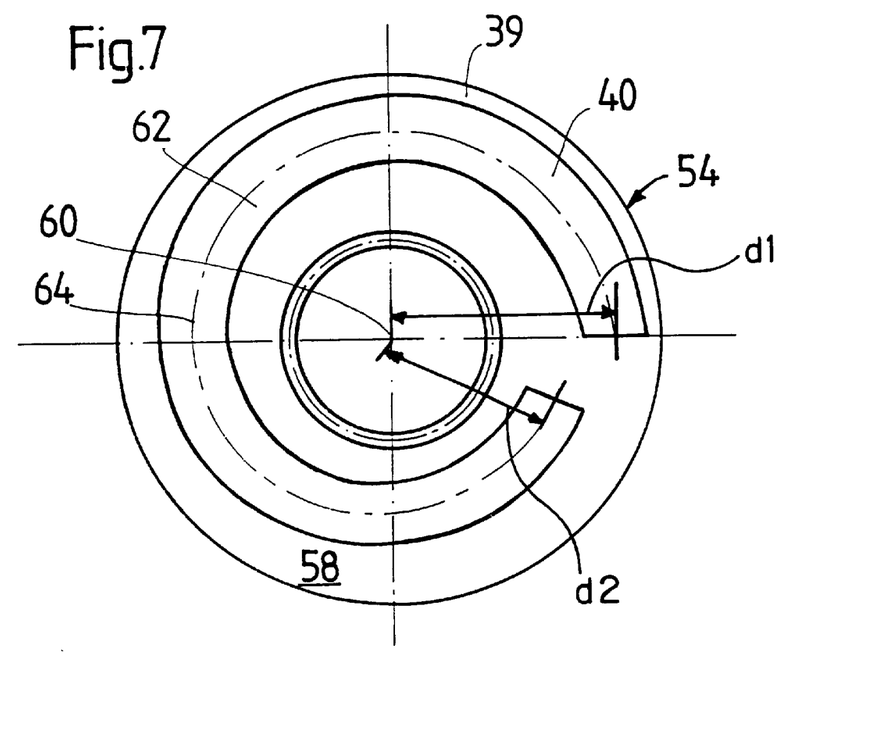
FIG. 7 is a top view showing the axially movable gear element with a spiral-shaped toothing path.

Referring now also to FIG. 2, the second toothing 40 of the planetary wheel 39 deviates from the circular shape, as illustrated by the fact that the second tooth 40 shown in the drawing above the rotational axis 60 is located radially farther outside than the tooth shown below this rotational axis 60. FIG. 7 shows this toothing course even more clearly, depicting the toothing in a top view. The toothing course is a curved path 62 that is predetermined as desired; this curved path preferably assumes the form of a spiral 64, as FIG. 7 shows, that begins at a radial distance d1 from a center of rotation of the planetary wheel 39 and gradually decreases so that it ends at a distance d2 from the center of rotation that is smaller than distance d1. Because of the curved path, as the deflection of the drive-side and output-side transmission elements 1 and 22 relative to each other increases, resulting also in a deflection of the planetary wheel 39, a translation change is attained between the planetary wheel 39 and the annulus 35, due to the spiral shape of this curved path.

During deflection of the planetary wheel 39 from its rest position due to the spiral-shaped path 62 of the second toothing 40, the engagement area 83 with the first toothing 36 of the annulus 35 migrates radially inward. To nonetheless have available at all times an engagement area 83 that extends over the entire tooth breadth of the second toothing 40 on the planetary wheel 39, the first toothing 36 on the annulus 35 is substantially larger in the radial direction than the second toothing 40 on the planetary wheel 39. The engagement area of the second toothing 40 into the first toothing 36 thus migrates only radially inward, without leaving the first toothing 36.

Due to the axially fixed arrangement of the planetary wheel 39 on the bearing journal 38, the intrinsic and absorption frequency of the torsional vibration damper 100, due to the spiral-shaped path 62 of the second toothing 40, depends only on the vibration angle. However, in the embodiments shown in FIGS. 4 and 5, speed dependency exists as well. Beginning with the embodiment in FIG. 5, an adjusting element 47 in the form of an axial spring is attached to the primary flange 4 of the drive-side transmission element 1. An angular support element 48 is attached by an axial leg to the outer circumference of the planetary wheel 39. The adjusting element 47 grasps behind a radial leg of the angular support element 48. The action of the adjusting element 47 is such that a radially outer end of the adjusting element 47 migrates radially outward under the effect of centrifugal force during the rotation of the torsional vibration damper 100, so that the adjusting element 47 is stretched radially, but reduced with respect to its axial extension. During this deformation of the adjusting element 47, the planetary wheel 39, which is arranged in an axially movable fashion on the bearing journal 38, is drawn on said journal 38 toward the primary flange 4, whereby the engagement depth of the second toothing 40 of the planetary wheel 39 into the first toothing 36 of the annulus 35 decreases. Starting from a certain limit speed, the centrifugal force reaches a strength at which the adjusting element 47 is so strongly deformed that the planetary wheel 39 assumes an axial position in which the engagement between the first and second toothings 36 and 40 is completely eliminated. Up to this time, the planetary wheel 39 is driven, due to the spiral-shaped path 62 of the second toothing 40, with variable translation, while after this time the torsional vibration damper acts without the planetary wheel as the gear element 54. As a result, starting at a certain speed, the mass inertia moment of the torsional vibration damper is reduced, so that the torsional vibration damper has advantages in the reduction of high-frequency torsional vibrations of smaller amplitude.

Figure 5:
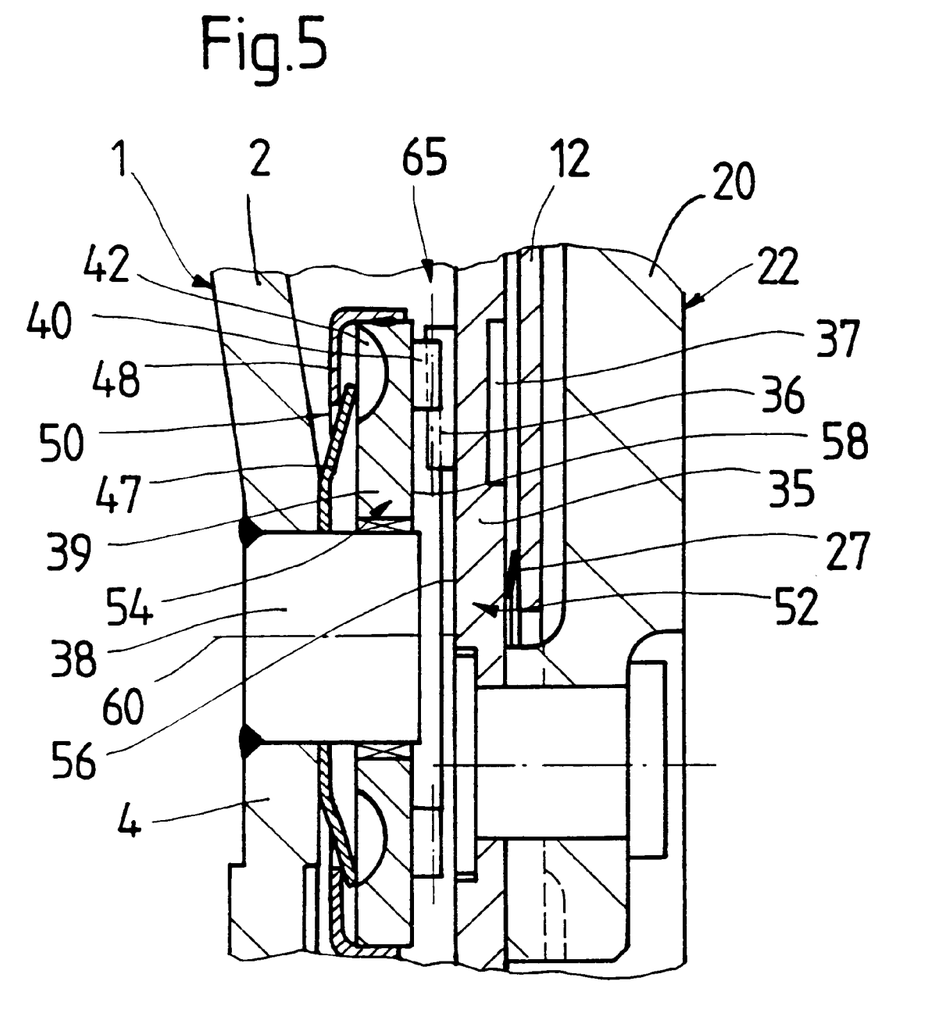
FIG. 5 is a view similar to that of FIG. 3, but of yet another embodiment with an adjusting element that acts on tensible force.

Of course, as soon as the speed is reduced at the torsional vibration damper 100, the adjusting element 47 will spring back into a position where the engagement of the first and second toothings 36 and 40 is established. Because the toothings 36 and 40 are axial toothings, their engagement with each other does not occur suddenly. As a result, the increase in transmitted moment occurs softly.

With respect to function, the adjusting element 47 acts as the positioning device 50 for the planetary wheel 39, because the adjusting element 47 establishes the particular axial position of the planetary wheel 39 in dependence on speed.

Figure 4:
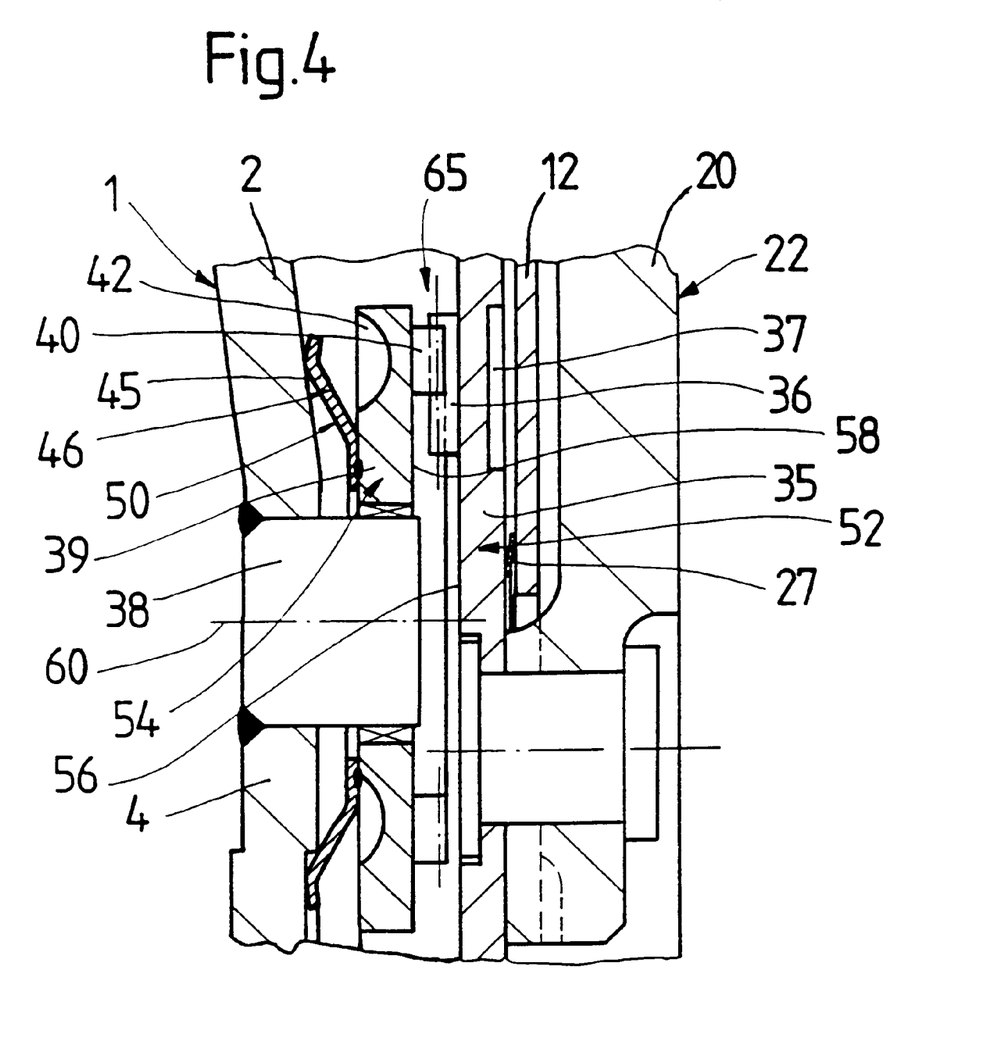
FIG. 4 is a view similar to that of FIG. 3, of another embodiment with an adjusting element that acts as a friction device.

FIG. 4 shows another speed dependent embodiment with another adjusting element 45 in the form of an axial spring attached to the planetary wheel 39 that comes to rest, with its counter-side, on the primary flange 4. During relative movements between the primary flange 4 and the planetary wheel 39, the end of the adjusting element 45 that faces the primary flange 4 rubs on its grease chamber side, so that this adjusting element 45 acts like a friction device 46. Like the adjusting element 47 described above, however, the adjusting element 45 is also axially deformable under the effect of the speed-determined centrifugal force, so that the friction effect also changes when there is a change in speed. Moreover, the adjusting element 45, due to its shape change, allows an axial movement of the planetary wheel 39, whereby this axial movement results from the axial forces that act between the first and second toothings 36 and 40. To this extent, the adjusting element 45 also acts as a positioning device 50.

Figure 6:
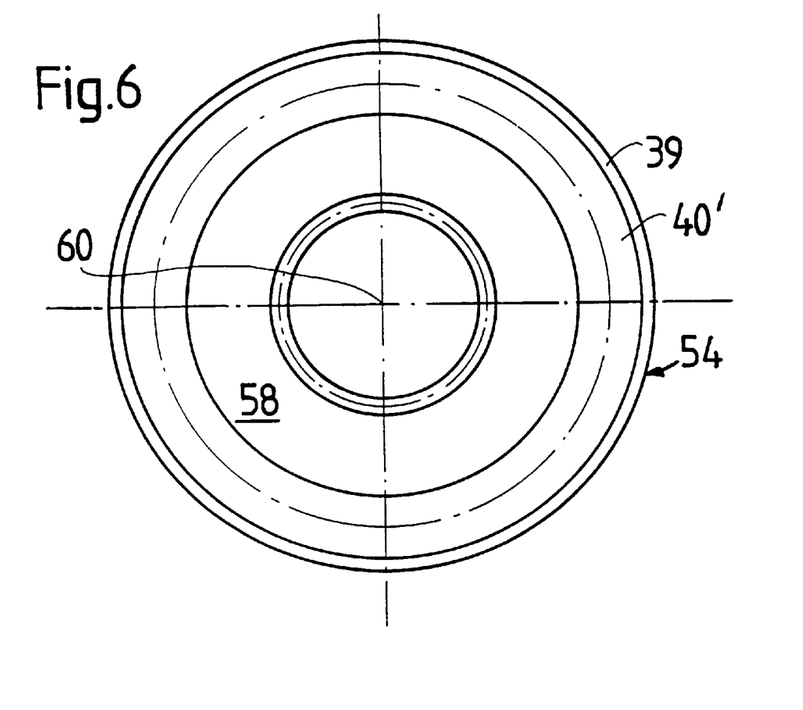
FIG. 6 is a top view showing the axially movable gear element with a constant tooting radius.

The embodiments described above in reference to FIGS. 1, 2, 4 and 5 display a planetary wheel 39 with a spiral-shaped curved path 62 of the second toothing 40. However, if no variable translation is desired between the annulus 35 and the planetary wheel 39, these embodiments may include a circular second toothing 40', as shown in FIG. 6.

Figure 3:
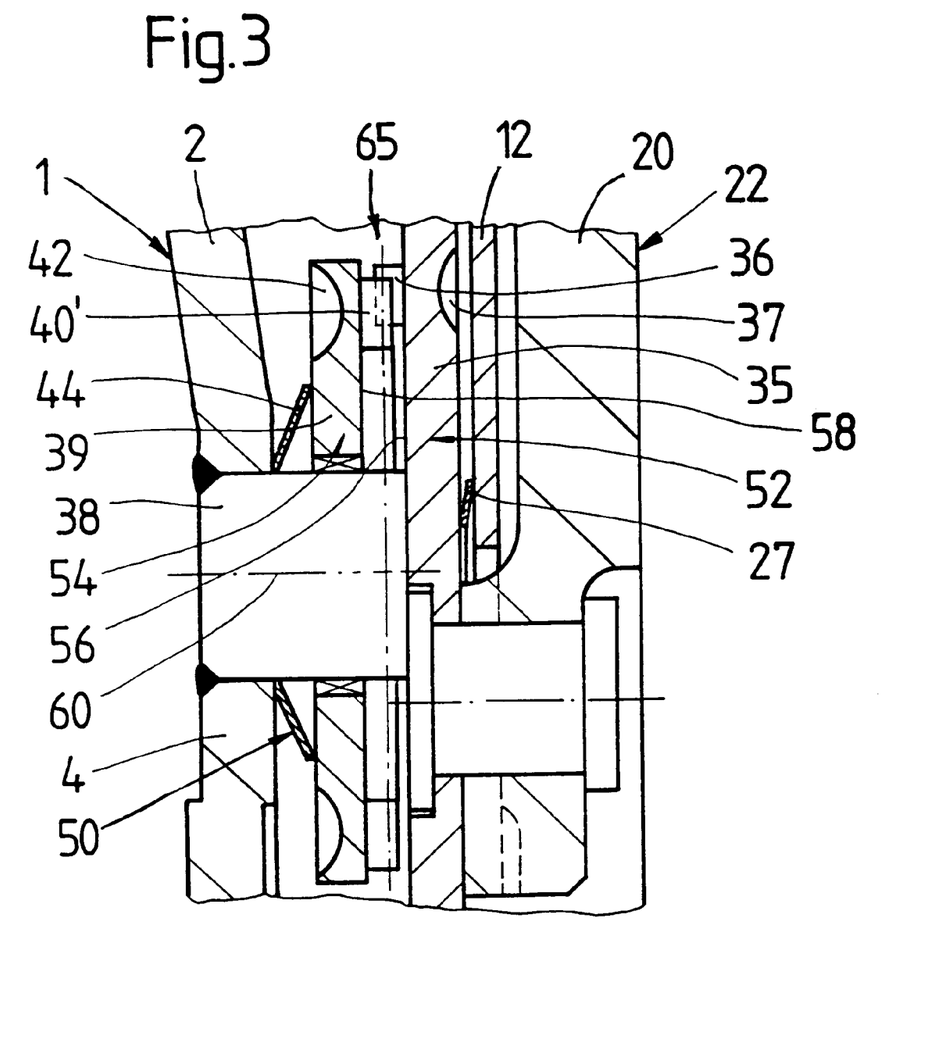
FIG. 3 is a view similar to that of FIG. 2, but of another embodiment of the torsional damper with a gear element axially movable relative to an adjusting element.

The embodiment in FIG. 3 also has a circular first and second toothing 40' of this type, for example. In this embodiment, an adjusting element 44 in the form of an axial spring is placed axially between the planetary wheel 39 and the primary flange 4 of the drive-side transmission element 1. The adjusting element 44 presses the planetary wheel 39 in the direction of the annulus 35 and thus ensures engagement of the first and second toothings 36 and 40'. At increasing speed, this adjusting element 44 is also deformed due to centrifugal force, so that, under the effect of axial forces in the first and second toothings 36, 40', the planetary wheel 39 is axially distanced from the annulus 35 and may even leave the engagement area of the first toothing 36 of the annulus 35. Thus, the adjusting element 44 also acts as positioning device 50.

The invention is not limited by the embodiments described above which are presented as examples only but can be modified in various ways within the scope of protection defined by the appended patent claims.

What is claimed is:

1. A torsional vibration damper having an axis of rotation, comprising:
   a drive-side transmission element rotatably mounted for rotating about the axis of rotation;
   an output-side transmission element rotatably mounted for rotation about the axis of rotation and rotatable relative to the drive-side transmission element;

a damping device connected between said drive-side transmission element and said output-side transmission element and comprising a first gear element and a second gear element;

a first set of teeth on an axial side of said first gear element facing said second gear element;

a second set of teeth on an axial side of said second gear element facing said first gear element for engaging said first set of teeth, said second set of teeth having a radial inner side and a radial outer side, and wherein both said radial inner side and said radial outer side of said second set of teeth project axially from said axial side of said second gear element; and a positioning device for axially positioning said first and second gear elements relative to each other and thereby for setting an axial engagement depth of said first set of teeth into said second set of teeth.

2. The torsional vibration damper of claim 1, wherein said positioning device comprises an adjusting element connected to one of said first and second gear elements for axially moving said one of said first and second gear elements.

3. The torsional vibration damper of claim 2, wherein the one of the first and second gear elements is movable away from the other one of the said first and second gear elements by a distance that exceeds the maximum penetration depth of the first and second set of teeth.

4. The torsional vibration damper of claim 2, wherein the adjusting element moves said one of said first and second gear elements in response to a speed of rotation of said torsional vibration damper.

5. The torsional vibration damper of claim 2, wherein said adjusting element comprises an axial spring which rests on a side of said first gear element that faces away from said first set of teeth and on the drive-side transmission element.

6. The torsional vibration damper of claim 2, wherein said adjusting element is attached to said first gear element and rests against the drive-side transmission element that is movable relative to the gear element, said adjusting element thereby forming a friction device.

7. The torsional vibration damper of claim 2, wherein said adjusting element is attached to one of the drive-side transmission element and the output-side transmission element and grasps axially behind a support element connected to the adjacent one of said first and second gear elements.

8. The torsional vibration damper of claim 1, wherein the second set of teeth changes its radial distance relative to a rotational axis of the second gear element along a circumference of the second gear element in accordance with a predeterminable curved path.

9. The torsional vibration damper of claim 8, wherein the curved path comprises a spiral.

10. The torsional vibration damper of claim 8, wherein said first set of teeth comprises a radial width which encompasses the change in the distance of the second set of teeth relative to the rotational axis of the second element for ensuring meshing engagement of said first set of teeth and said second set of teeth on the entire radial width of the second set of teeth on the second gear element.

11. The torsional vibration damper of claim 1, wherein said damping device comprises a planetary gear set wherein said first gear element comprises an annulus and said second gear element comprises a planetary wheel of the planetary gear set.

12. A torsional vibration damper having an axis of rotation, comprising:

a drive-side transmission element rotatably mounted for rotating about the axis of rotation;

an output-side transmission element rotatably mounted for rotation about the axis of rotation and rotatable relative to the drive-side transmission element;

a damping device connected between said drive-side transmission element and said output-side transmission element and comprising a first gear element and a second gear element;

a first set of teeth on an axial side of said first gear element facing said second gear element;

a second set of teeth on an axial side of said second gear element facing said first gear element for engaging said first set of teeth, wherein the second set of teeth changes its radial distance relative to a rotational axis of the second gear element along the circumference in accordance with a predeterminable curved path and said first set of teeth comprises a radial width which encompasses the change in the distance of the second set of teeth relative to the rotational axis of the second element for ensuring meshing engagement of said first set of teeth and said second set of teeth on the entire radial width of the second set of teeth on the second gear element; and a positioning device for axially positioning said first and second gear elements relative to each other and thereby for setting an axial engagement depth of said first set of teeth into said second set of teeth.

13. A torsional vibration damper having an axis of rotation, comprising:

a drive-side transmission element rotatably mounted for rotating about the axis of rotation;

an output-side transmission element rotatably mounted for rotation about the axis of rotation and rotatable relative to the drive-side transmission element;

a damping device connected between said drive-side transmission element and said output-side transmission element and comprising a first gear element and a second gear element;

a first set of teeth on an axial side of said first gear element facing said second gear element;

a second set of teeth on an axial side of said second gear element facing said first gear element for engaging said first set of teeth, wherein the second set of teeth changes its radial distance relative to a rotational axis of the second gear element along the circumference in accordance with a spiral path; and a positioning device for axially positioning said first and second gear elements relative to each other and thereby for setting an axial engagement depth of said first set of teeth into said second set of teeth.

* * * * *